United States Patent
Tunnell, IV

[11] Patent Number: 5,732,978
[45] Date of Patent: Mar. 31, 1998

[54] WEATHER RESISTANT MAPBOARD ASSEMBLY

[76] Inventor: Harry D. Tunnell, IV, 3016 Vance Ave., Fort Wayne, Ind. 46805

[21] Appl. No.: 740,793

[22] Filed: Nov. 1, 1996

[51] Int. Cl.$^6$ ..................................... B42D 15/00
[52] U.S. Cl. .................................... 283/34; 40/904
[58] Field of Search ........................ 434/150, 151, 434/152, 153; 40/904; 283/34, 35, 115, 66.1

[56] References Cited

U.S. PATENT DOCUMENTS

| | | | |
|---|---|---|---|
| 2,729,908 | 1/1956 | Miller | 40/904 X |
| 2,791,040 | 5/1957 | Santorelli | 40/904 X |
| 2,889,638 | 6/1959 | Anderson | 35/42 |
| 3,608,219 | 9/1971 | Verebay | 40/102 |
| 4,360,346 | 11/1982 | Ehsanipour | 434/153 |
| 4,673,197 | 6/1987 | Shtipelman | 40/904 X |
| 4,810,544 | 3/1989 | Hickman | 428/40 |
| 4,998,752 | 3/1991 | Judson | 283/34 |
| 5,007,192 | 4/1991 | Hochberg | 40/661 |
| 5,125,561 | 6/1992 | Idstein | 283/116 X |
| 5,414,946 | 5/1995 | Leon | 40/904 X |
| 5,472,239 | 12/1995 | Trujillo | 283/34 |

*Primary Examiner*—Willmon Fridie, Jr.
*Attorney, Agent, or Firm*—Baker & Daniels

[57] ABSTRACT

The present invention involves a map board assembly having one or more weather resistant sleeves. The sleeves are formed of a non-porous, transparent flexible material. Maps and other paper documents may be releasably secured to rigid, planar backing members and subsequently inserted into the sleeves. The maps may then be viewed through the transparent sleeve. Erasable markings may be placed on both the sleeves and rigid backing members due to their non-porous nature. The openings to the sleeves may be closed by the use of velcro strips. In map board assemblies having multiple sleeves, velcro strips or other suitable fastening devices may also be used to secure the individual sleeves together in a folded position. A flexible, non-porous, transparent overlay may be placed over a map displayed within a sleeve and have erasable markings placed thereon. The marked upon overlay may then be transferred to a different sleeve to thereby transfer or analyze the information conveyed by the markings. The overlay may be attached to the sleeves by the use of cooperating velcro strips.

26 Claims, 5 Drawing Sheets

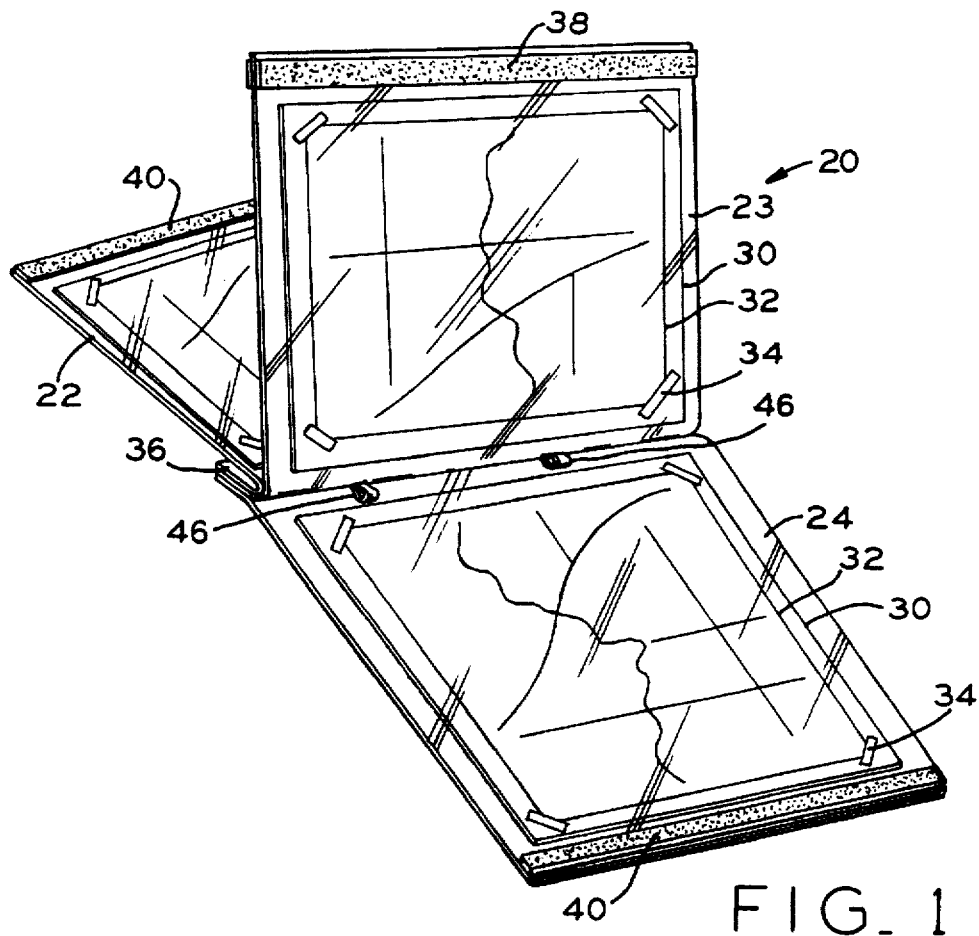
FIG_1
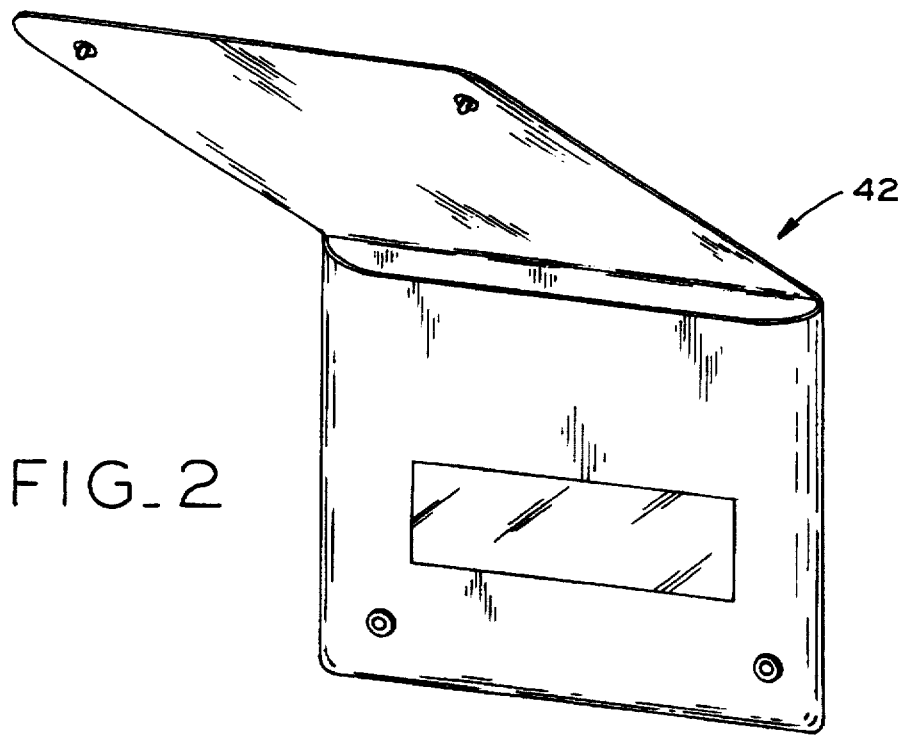
FIG_2

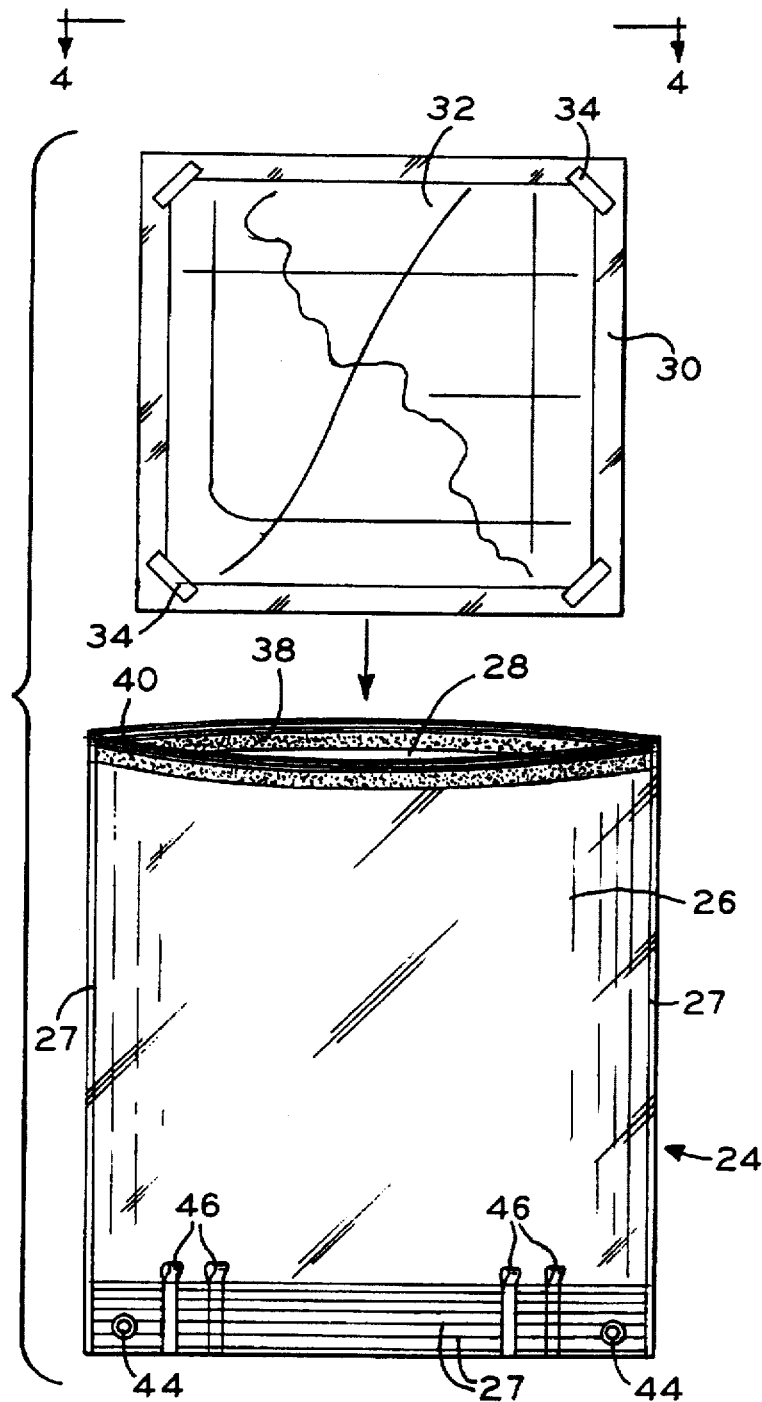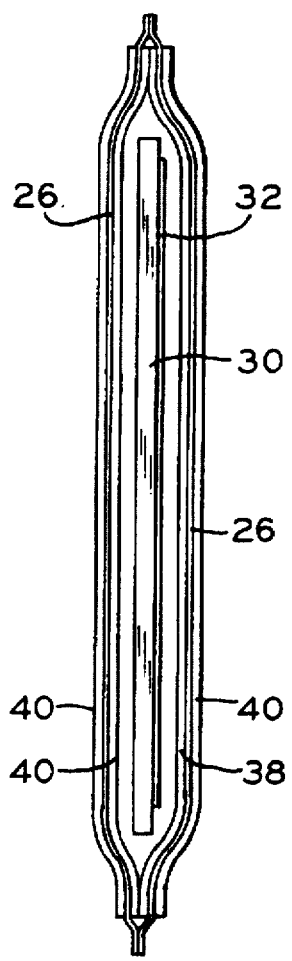
FIG. 3
FIG. 4

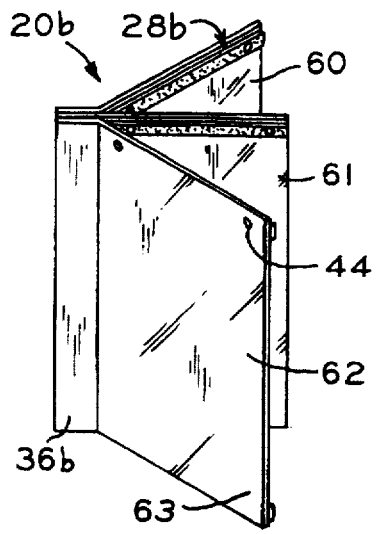
FIG_8
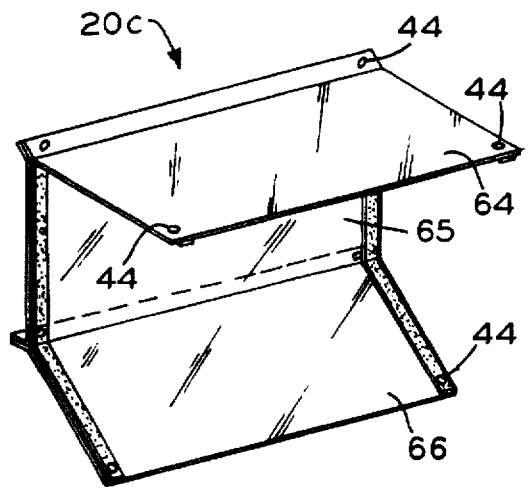
FIG_9
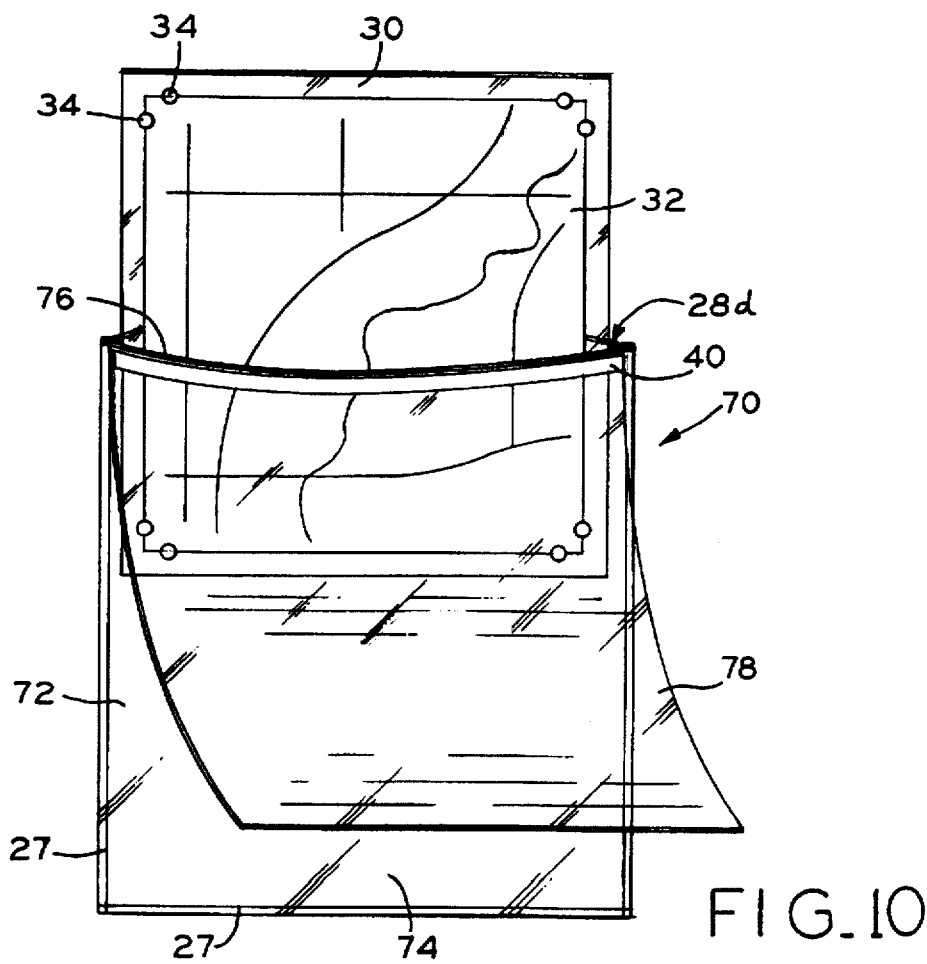
FIG_10

WEATHER RESISTANT MAPBOARD ASSEMBLY

BACKGROUND OF THE INVENTION

1. Field of the Invention

The present invention relates to an apparatus for holding and displaying maps.

2. Description of the Related Art

A variety of map display apparatus have been developed, many of which permit erasable markings to be made directly on the map or upon a transparent sheet overlaying the map.

For example, one known map display apparatus includes maps printed on foldable cards. The cards are comprised of a lightweight cardboard sandwiched between two transparent plastic sheets. The transparent sheets allow the cards to have a trip route erasably marked thereon. After the cards have been marked up, they may be placed in transparent envelopes which are held in a storage box.

Another map holding device includes a lapboard having two clear sheets which may clamp a sheet of paper, such as an aviation chart and flight plan, therebetween. The clear sheets may be erasably written on without directly marking the paper sheets.

A similar device, a customized trip planner, includes a base map and a plurality of pre-printed transparent sheets having annotated outlines of the base map. One or more of the transparent sheets may be placed over the base map to cross reference the information on the transparent sheets with the information conveyed by the base map. The transparent sheets are held in place by the attraction of static electricity.

While these map holders are quite useful for their intended purposes, they are best suited for use in a controlled environment such as the interior of a motor vehicle, airplane or building. What is needed is a more versatile and rugged map holder which may be economically manufactured and which is adapted for the display, utilization and protection of maps and other paper documents in an outdoor environment or allows the easy transfer of information or map symbols between agencies that have similar map sheets.

SUMMARY OF THE INVENTION

The present invention provides a mapboard assembly for displaying maps and other paper documents which protects the maps from moisture and dust and permits erasable markings to be made on a transparent portion of the assembly overlaying the displayed map.

The invention comprises, in one form thereof, two non-porous, transparent sheets defining a pocket with a closable opening. A rigid backing member has paper maps releasably attached to two generally planar and opposite surfaces. The backing member is then inserted into the pocket and the maps may be viewed through the sleeve. A plurality of such sleeves may be secured together.

In another form thereof, the invention additionally comprises a non-porous overlay which may be erasably marked upon. The overlay may be aligned with one of the displayed maps to trace features therefrom or record notes and graphics. The overlay may then be subsequently transferred to overlie another displayed map and thereby combine the markings on the overlay with the second displayed map.

An advantage of the present invention is that the sleeves provide a nonporous barrier which shields the displayed maps thereby permitting conventional paper maps to be utilized in environments where moisture, dust and dirt are present.

Another advantage is that the sleeves overlying the maps provide a transparent, nonporous material which may be erasably marked upon by grease pencils, alcohol pens, water soluble pens, and other non-permanent writing utensils to supplement the displayed maps prior to taking the maps into the field or to record data gathered in the field on the sleeve material overlying the maps.

Another advantage is that the backing member may be a nonporous, transparent material and have erasable notes or graphics recorded thereon before it is inserted into the sleeve pocket.

The mapboard assembly of the present invention is particularly well-suited for outdoor activities which require the use of maps or other documents such as notes, codes, call signs, and checklists. For example, the mapboard assembly would be particularly well suited for military exercises in which maps are used for navigational purposes and data gathered during the exercise needs to be recorded over a pertinent portion of the map. For example the present locations of troops or mobile equipment could be recorded on the erasable outer surface of the sleeve or, if the gathered information needs to be communicated to another person, the data could be erasably recorded on a detachable overlay by a person in the field and the overlay could subsequently be transferred to the mapboard assembly of another person who requires the gathered information.

Other uses include geological, archeological and environmental investigations where information can be recorded directly over a relevant portion of the displayed map without removing the displayed map from its protective sleeve. The mapboard assemblies having several sleeves allow a person to utilize numerous maps in the field without having to remove individual maps from the protective sleeves of the mapboard assembly. Additionally, gathered information can be recorded on the sleeves for later permanent recordation or for merely temporary purposes.

Furthermore, a detachable overlay can be used to record and transfer erasable information between maps. The variety of information which could be erasably recorded over one map and transferred and combined with a second map is extremely varied. As one example, one of the displayed maps could illustrate ground water elevations for a particular area and a second displayed map could illustrate the surface illustrations. If a party was in the field and needed to determine the depth to the ground water in a particular region, the overlay could be placed over the ground water map, relevant elevations for the chosen region could be erasably recorded on the overlay and the overlay could then be transferred to the surface elevation map and the depth to the ground water table over the selected region could be easily determined. The transferred data could also consist of data gathered in the field and recorded directly on the overlay over a first map rather than being information traced from the first map.

The use of detachable overlays also allows the transfer of information between different agencies that are working in the same areas. Examples include federal law enforcement agencies working with local agencies and transferring information on certain types or patterns of crime; police investigators that operate with fire departments and trade information on arson; and different military units operating in the same area that may need to trade graphic information.

In other embodiments of the invention, elastic bands are attached to the assembly to hold useful accessories such as chem-lites to illuminate the displayed maps in low light conditions.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 1 is a perspective view of the present invention.

FIG. 2 is a perspective view of a map case in which the present invention may be carried.

FIG. 3 is an exploded view of the center sleeve of FIG. 1.

FIG. 4 is an edge view of the center sleeve taken along line 4—4 of FIG 3.

FIG. 8 is a perspective view of a third embodiment of the present invention.

FIG. 9 is a perspective view of a fourth embodiment of the present invention.

FIG. 10 is a perspective view of a map board assembly having only one sleeve.

Figure 5:
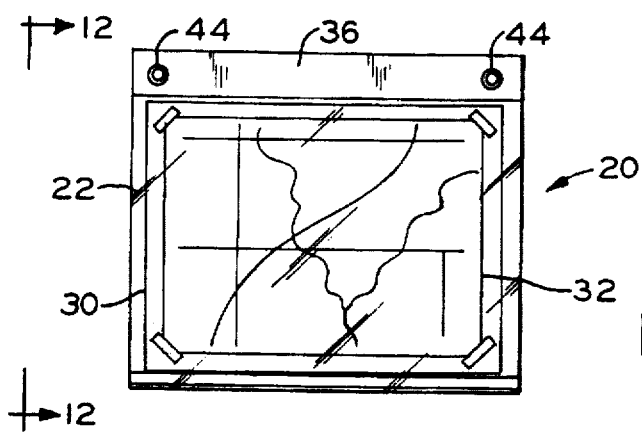
FIG. 5 is a plan view of the embodiment of FIG. 1 in a folded position.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the exemplary embodiments disclosed below are not intended to be exhaustive or limit the invention to the precise forms disclosed in the following detailed description.

DESCRIPTION OF THE PRESENT INVENTION

Referring to FIG. 1, the present invention provides a foldable, weather resistant, mapboard assembly 20. Mapboard assembly 20 has three sleeves, two outer sleeves 22, 24 and a center sleeve 23. The individual sleeves 22, 23, 24 may be manufactured by securing two rectangular sheets 26 of transparent, non-porous material, such as vinyl, acetate or mylar, along three sides, by threaded stitching 27 or other suitable means, such as heat bonding or adhesives, to form a pocket. The fourth side of the sleeve defines a closable opening 28 which permits a map board member 30 to be inserted into a sleeve 22, 23, 24. Although the illustrated map board assembly 20 has three sleeves, other embodiments may have more, or fewer, than three sleeves.

The mapboard member 30 forms a rigid backing member for a conventional paper map 32 or other document which may be releasably secured to the mapboard 30 by the use of commonly available drafting tape 34 which will secure the map 32 to the mapboard 30 without permanently adhering to the paper map 32 or the mapboard 30. Mapboard 30 is formed of a rigid, nonporous, transparent material such as plexiglass. Maps 32 may be taped to both sides of mapboard 30 prior to their insertion into one of the sleeves 22, 23, 24. The maps 32 may then be viewed through transparent sheets 26 which comprise sleeves 22, 23, 24.

The sleeves 22, 23, 24 are secured to each other by stitching 27 to form a hinge flap 36. Hinge flap 36 permits the individual sleeves 22, 23, 24 to be turned like the pages of a book as can be seen from FIG. 1, where the sleeves are in an open position, and FIG. 5 where the sleeves are in a closed or folded position. Metal grommets 44 may be placed in the hinge flap 36 to not only help fasten the sleeves 22, 23, 24 together but also to provide means by which the mapboard assembly 20 can be readily hung. For example, nails placed in a wall could be used to hang the mapboard assembly and thereby store the assembly 20 and/or display a map 32 in a convenient location. Other suitable means, such as rivets and similar fasteners, may be used instead of stitching 27 and grommets 44 to secure the sleeves together.

Figure 11:
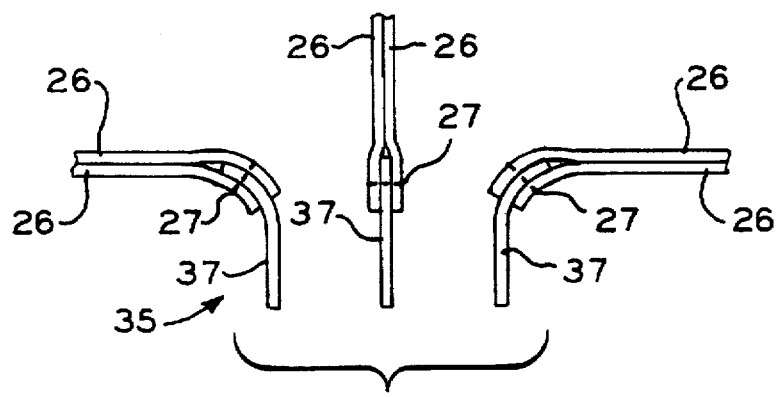
FIG. 11 is an exploded view of a cloth hinge.
Figure 12:
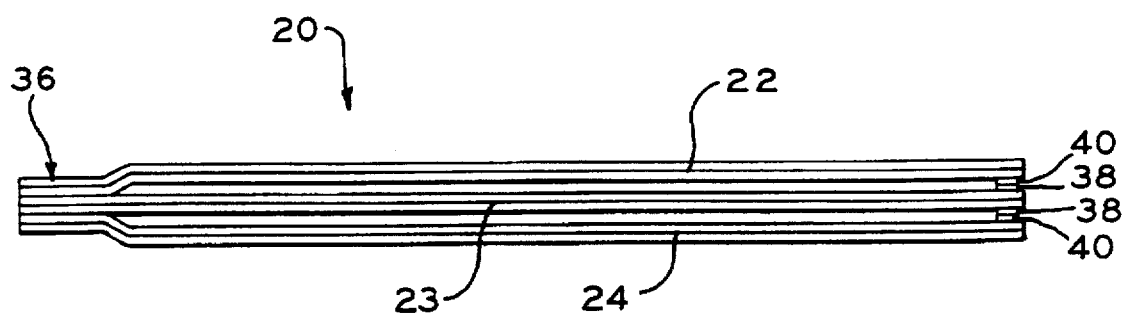
FIG. 12 is an edge view of a folded map board assembly taken along line 12—12 of FIG. 5.

A cloth hinge 35, shown in an exploded view in FIG. 11, can also be used to secure the individual sleeves of a map board assembly together. Cloth hinge 35 is formed by securing the two sheets 26 of each sleeve to a length of durable cloth 37 with stitching 27 or other suitable means and then securing the lengths of cloth 37 together using stitching or other suitable fastening means.

Velcro pile strips 38 and Velcro hook strips 40 are stitched or otherwise attached to the sleeves to permit the closing of opening 28 and to detachably secure the sleeves 22, 23, 24 in a folded position as shown in FIG. 5. Other securing means, such as zippers, snaps and similar fastening devices, could also be used to close opening 28 or to detachably secure the individual sleeves 22, 23, 24 in a folded position.

Mapboard assembly 20 has dimensions which permit it to be inserted into a canvas carrying bag 42 (FIG. 2) such as a standard military issue canvas map or dispatch case when the mapboard assembly is in a folded position. For example, a 12"×12" military issue map case could be used to carry a mapboard assembly having overall dimensions of approximately 11"×11" which uses 1/16" or 1/8" thick mapboards 30 having dimensions of approximately 10¾"×10¾". A 8½"×11" military issue dispatch case, on the other hand, could be used with a mapboard assembly having overall dimensions of approximately 10"×8" and 1/16" or 1/8" thick mapboards 30 with dimensions of approximately 7¾"×9¾". By sizing the mapboards 30 to fit snugly within a sleeve pocket, relative movement between the sleeve and the mapboards can be minimized.

Figure 6:
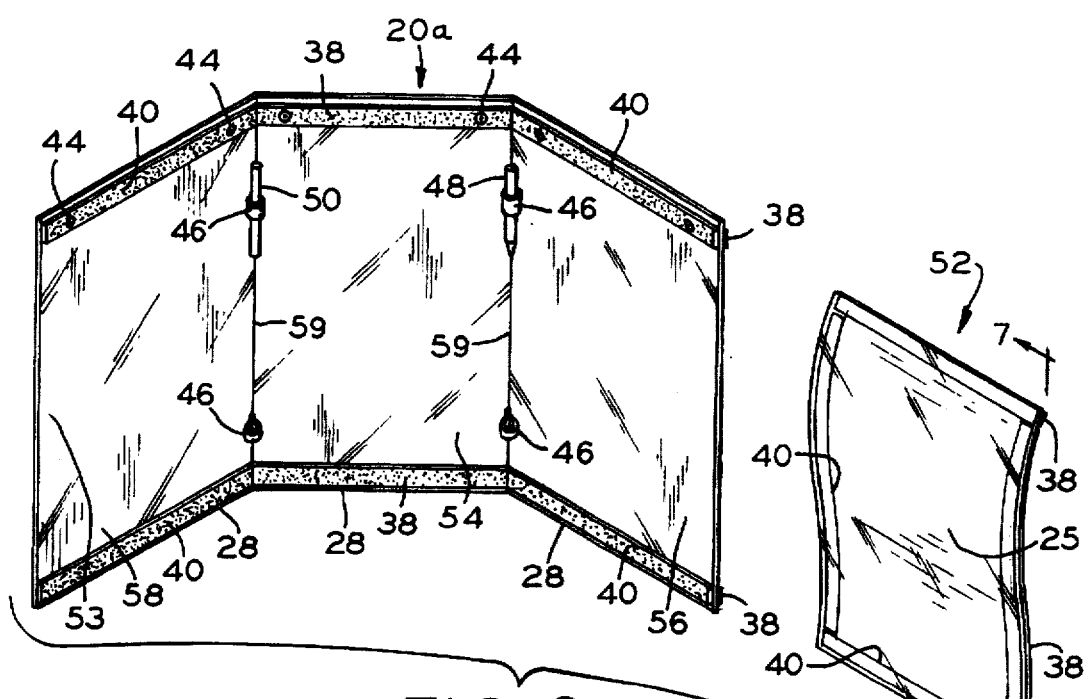
FIG. 6 is a perspective view of a second embodiment of the present invention.
Figure 7:
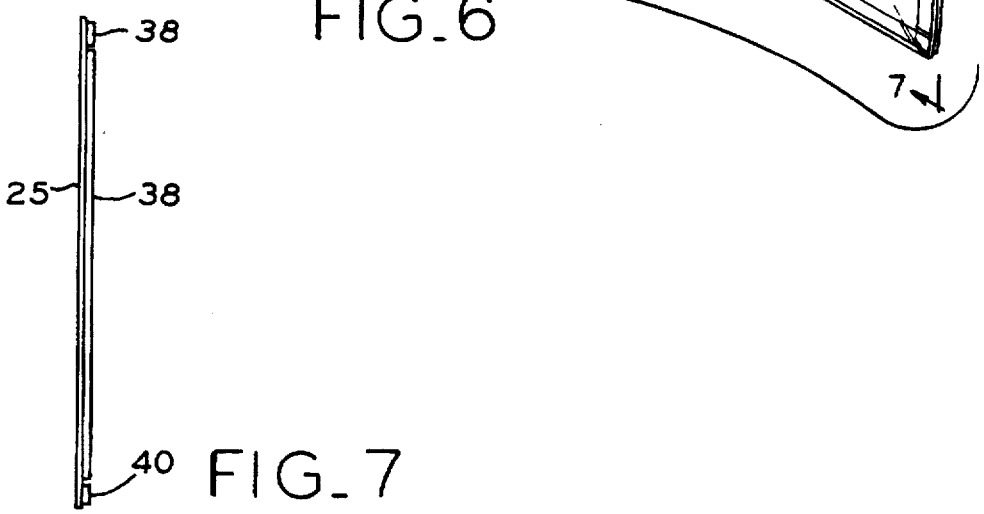
FIG. 7 is an edge view of an overlay taken along line 7—7 of FIG. 6.

As can be seen from FIGS. 1, 3 and 6, elastic bands 46 may be attached to the mapboard assembly by stitching a length of looped elastic material to one or more of the sleeves. The elastic bands 46 may be used to hold an erasable marker 48. Erasable marker 48 may be a grease pencil, alcohol pen or other form of non-permanent marker which produces marks which can be erased from nonporous surfaces. Marker 48 may be used to write on nonporous, transparent sheets 26 which form sleeves 22, 23, 24 or on mapboards 30 and the materials used to form these components should be sufficiently non-porous to prevent the material from permanently absorbing the marks from an alcohol pen or other non-permanent marker. For example, in the preparation for a military, geological, archeological or other outdoor expedition, erasable notes could be written on the mapboard 30 after attaching map 32 but before inserting the mapboard 30 into one of the sleeves 22, 24 for later reference in the field. Information gathered during the expedition could be noted on the exterior surface of the sleeve over the pertinent portion of the map. It is also possible to secure a single map 32 to mapboard 30 with its printed surface facing transparent mapboard 30 whereby marker 48 can be used to place information on mapboard 30 so that the markings overlay a pertinent portion of the map 32.

The nonporous nature of sheets 26 not only permits the markings produced by marker 48 to be erased after the markings are no longer needed, but it also protects maps 32 from moisture dirt and dust. Thus, even though mapboard assembly 20 need not be entirely water-proof, it can be used in an outdoor environment even when it is raining or other forms of precipitation or moisture are present and provide significant moisture protection for maps 32 disposed within its nonporous sleeves. Nonporous sleeves 22, 23, 24 also provide protection against dirt and dust and enable a person to utilize maps 32 with unclean hands or in a dusty environment without soiling the maps 32. This makes the mapboard assembly 20 particularly useful for outdoor expeditions such as military exercises, geological investigations, and archeological investigations and any number of other outdoor activities in which maps or other documents are utilized in the field.

The versatility of mapboard assembly 20 is further enhanced by elastic bands 46 which can be used to hold a chem-light 50. Chem-light 50 is a conventional device comprising a tubular plastic cylinder which contains a plurality of segregated chemical solutions. When the chem-light 50 is bent, a partition within the tube is broken, the chemical solutions interact and emit light without the need of an external power source. The chem-lights 50 may be stored in elastic bands 46 prior to their actuation as well as after actuation to illuminate maps 32 during nighttime operations. Other illuminating means such as battery powered light bulbs could also be held by elastic bands 46 to facilitate the use of mapboard assembly 20 in low light conditions. Luminescent strips may also be applied to the exterior surface of sleeves 22, 23, or 24 or to map board member 30 to provide illumination of the displayed documents. Typically luminescent strips or tape can be cut to size and has an adhesive backing similar to that of transparent tape. The luminescent strips are flexible and give off light in a manner which is similar to the way some watch dials glow after being exposed to light and subsequently placed in a dark area. Such luminescent strips are well known and widely used in military applications.

The use of elastic bands 46 is not limited to markers and illumination means and elastic bands 46 could also be used to secure any useful item having a size which permits it to be secured by the bands. For example, some compasses, measuring scales and dividers may have a shape and size which permit them to be secured by bands 46.

The mapboard assemblies 20a, 70 shown in FIGS. 6 and 10 illustrate the use of overlays 52, 78. Overlay 52 is constructed of a flexible, transparent, nonporous material such as acetate sheet 25. Velcro strips 38, 40 are attached to the perimeter of overlay 52 to enable the attachment of overlay 52 to the exterior of a sleeve. Marker 48 may be used to erasably record notations or graphical information on overlay 52 in coordination with an underlying map 32. The overlay 52 may then be transferred to a second sleeve to combine the notations or graphics on overlay 52 with the information provided by the map displayed in the second sleeve. Overlay 52 would also permit information gathered in the field and recorded in relationship to a first map, such as a topographical map, to then be transferred to a second sleeve and compared with a map conveying different information. Of course, for overlay 52 to be used in such a recordation and comparison of data, the maps employed would have to cover a common area and have a common scale. By utilizing a nonporous material to form overlay 52, the recorded data could be erased when it was no longer needed and overlay 52 could be used to gather or compare a different set of data. Thus, the use of overlays 52, 78 and their associated assemblies would allow information to be passed between different agencies, e.g., between federal and local agencies or between police and fire departments, as long as the different agencies have the same maps.

FIGS. 6, 8, 9 and 10 illustrate mapboard assemblies 20a, 20b, 20c and 70 respectively. Mapboard assemblies 20a, 20b, 20c are similar to mapboard assembly 20 but the individual sleeves of mapboard assemblies 20a, 20b, 20c are attached in a different configuration than that of mapboard assembly 20. Mapboard assembly 20a is illustrated in FIG. 6 and has a central sleeve 54 and two side sleeves 56, 58. Central sleeve 54 has a slightly larger width than side sleeve 56 to permit side sleeve 56 to be folded inward over central sleeve 54 prior to folding side sleeve 58 inward over side sleeve 56. Velcro strips 38, 40 are placed along the perimeter of the sleeves 54, 56, 58 not only to secure the sleeves together in a closed position but also to enable overlay 52 to be positioned over any of the maps displayed within the sleeves. Overlay 52 has both velcro pile 38 and velcro hook 40 strips along its perimeter to enable it to be secured to any of the sleeves 54, 56, 58. Alternative embodiments could employ an overlay having only a single type of velcro strip and sleeves which have, in addition to the velcro used to secure the sleeves together, velcro strips dedicated to securing the overlay to the sleeve. By increasing the width of the strips or placing them along each perimeter of the sleeve and/or overlay, an overlay, after it has been marked up and removed from a first sleeve, will be more likely to have its velcro strips overlay the velcro strips of a second sleeve when the markings on the overlay are aligned over a second map displayed in the second sleeve.

Two elongate sheets 53 are used form sleeves 54, 56, 58, a single sheet folded along the edge opposite openings 28 could also be used to form map board assembly 20a. Thus, map board assembly 20a does not include a hinge flap 36 to secure sleeves 54, 56, 58 together, but instead has two seams 59 formed by stitching the two sheets 53 together to separate the pockets of the individual sleeves 54, 56, 58. The seams 59 also define the fold lines along which the sleeves may be pivoted to place assembly 20a in a closed or folded position (not shown) and elastic bands 46 may be secured to assembly 20a by the stitching along seams 59.

Mapboard assembly 20b is illustrated in FIG. 8 and has three sleeves 60, 61, 62 which are secured together utilizing a hinge flap 36b along a sleeve edge which is adjacent to the sleeve edge defining closable openings 28b. Although sleeve 62 is shown without a velcro strip on its exterior surface 63 which does not face central sleeve 61, a velcro strip could be applied to surface 63 to facilitate the releasable attachment of an overlay. Although mapboard assembly 20b is shown with three sleeves, it could also be manufactured with more, or fewer, than three sleeves.

Mapboard assembly 20c is illustrated in FIG. 9 and has three sleeves 64, 65, 66. Mapboard assembly 20c differs from mapboard assembly 20a in the placement of grommets 44. Mapboard assembly 20c has grommets 44 located at positions whereby assembly 20c may be hung on a wall in an open position so that the sleeves are positioned one above another rather than side by side. Assembly 20c also differs from assembly 20a in that assembly 20c utilizes hinge flaps 36c to secure sleeves 64, 65, 66 together rather than forming three sleeves from two integral sheets of transparent material. Other configurations of sleeves are also possible and may include assemblies having either more or fewer than three sleeves.

A mapboard assembly 70 having only a single sleeve 72 is shown in FIG. 10. Sleeve 72 is constructed of two rectangular, flexible, transparent sheets 74 formed of a non-porous material such as vinyl, acetate or mylar. Sheets 74 are secured along three edges by stitching 27, or other suitable attachment means, and has a closable opening 28d at a fourth edge 76. Opening 28d has a velcro pile strip located on the interior surface of one sheet 74 alongside fourth edge 76 and a velcro hook strip located on the opposite sheet 74 alongside fourth edge 76. Pile velcro strips are located on the exterior surface of both sheets 74 alongside fourth edge 76 to facilitate the releasable attachment of overlay 78 or 52 to either side of sleeve 72. Overlay 78 is similar to overlay 52, except overlay 78 has only a single velcro hook strip 40 disposed along one of its edges.

Overlay 78 could be used not only to transfer information between the two sides of sleeve 72, but it could also be used to transfer information to another map board assembly. For example, map board assembly 70 could be taken into the field to gather and record information on overlay 78. Overlay 78 could then be brought back to a central location where overlay 78 could be transferred to a map board assembly 20a hanging on the wall of a temporary structure to assess the gathered information or compare it with other data. Grommets 44 placed adjacent fourth edge 76 in both sheets 72 enable assembly 70 to also be hung from a wall.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A weather resistant map board assembly for holding and displaying a paper map, said map board assembly comprising:
   a sleeve comprising first and second substantially non-porous sheets, said sheets attached together and defining a pocket and an opening between said sheets, said sheets further including means for closing said opening to said pocket, at least one of said first and second sheets having a transparent portion; and
   a rigid backing member disposed in said pocket, said backing member having a first substantially planar surface whereby the paper map may be attached to said planar surface and be viewed through said transparent portion.

2. The map board of claim 1 wherein said first and second sheets respectively have a first edge and a second edge, said edges defining said opening, said closing means further comprising a first velcro strip disposed on an interior surface of said first sheet adjacent said first edge and a second velcro strip disposed on an interior surface of said second strip adjacent said second edge whereby said first and second velcro strips are releasably engageable.

3. The map board assembly of claim 1 wherein said sleeve further comprises a plurality of grommets whereby said map board assembly may be suspended by said grommets.

4. The map board assembly of claim 1 wherein both of said first and second sheets comprise a flexible transparent material and said backing member has a second substantially planar surface opposite said first planar surface; whereby a second paper map may be attached to said second planar surface and viewed through one of said sheets when said backing member is inserted into said pocket.

5. The map board assembly of claim 4 further comprising a non-porous, transparent overlay including means for securing to a first exterior surface of said first sheet and a second exterior surface of said second sheet.

6. The map board assembly of claim 5 wherein said means for securing includes hook and pile strips.

7. The map board assembly of claim 1 further comprising an elastic loop secured to said sleeve whereby an accessory may be inserted in said loop.

8. The map board assembly of claim 7 wherein said elastic loop may accommodate a light source whereby said light source may illuminate one of the maps.

9. The map board assembly of claim 1 wherein said rigid backing member comprises a planar sheet of non-porous, transparent material.

10. A weather resistant map board assembly for holding and displaying a plurality of paper maps, said map board assembly comprising:
    a plurality of sleeves, each of said sleeves comprising a pair of non-porous sheets, each of said pairs of sheets attached together and respectively defining a sleeve pocket and an opening between said sheets of each said pair, each of said pair of sheets further including means for closing said opening to each respective pocket, each of said pairs of sheets having a transparent portion; and
    a plurality of rigid, planar backing members respectively disposed in said plurality of pockets, each said backing member having a first substantially planar surface whereby one of the maps may be attached to each said first surface; each of said releasably attached maps being viewable through one of said transparent portions.

11. The map board assembly of claim 10 wherein each of said sheets comprises a flexible, transparent material and each of said backing members has a second substantially planar surface opposite said first surface whereby a second one of the maps may be attached to each of said second surfaces and each of said releasably attached second maps are viewable through said transparent material when said backing members are respectively inserted into said plurality of pockets.

12. The map board assembly of claim 10 wherein each of said openings is defined by first and second edges and said opening further comprises a hook strip disposed on an interior surface of said pair of sheets adjacent said first edge and a pile strip disposed on an interior surface of said pair of sheets adjacent said second edge whereby said hook and pile strips are engageable.

13. The map board assembly of claim 10 further comprising a hook strip and a pile strip, said hook strip being positioned on an exterior surface of a first one of said sleeves, said pile strip being positioned on an exterior surface of a second one of said sleeves whereby said hook and pile strips are engageable when said map board assembly is in a folded position.

14. The map board assembly of claim 10 further comprising threading securing said sleeves together.

15. The map board assembly of claim 10 further comprising a nonporous, transparent overlay detachably securable to an exterior surface of each of said sleeves whereby erasable marks on said overlay may overlie the maps.

16. The map board assembly of claim 10 further comprising an elastic loop secured to said map board assembly whereby an accessory may be inserted in said loop.

17. The map board assembly of claim 10 further comprising a light source detachably secured to map board assembly whereby said light source may illuminate one of the maps.

18. The map board assembly of claim 10 wherein each of said backing members comprises a sheet of transparent, non-porous material.

19. A weather resistant map board assembly for holding and displaying a plurality of paper maps, said map board assembly comprising:

a plurality of sleeves, each sleeve comprising a pair of rectangular, flexible, non-porous and transparent sheets, each pair of sheets permanently secured together along three edges, an unsecured fourth edge of said sheets defining a closable opening to a pocket formed between each said pair of sheets; said sleeves foldably secured together; and a plurality of rigid, planar, rectangular backing members, each of said backing members disposed in a respective one of said pockets, each of said backing members having first and second planar surfaces, one of the plurality of maps being securable to each of the planar surfaces whereby the secured maps may be viewed through said transparent sheets.

20. The map board assembly of claim 19 wherein each of said sleeves further comprises a hook strip and a pile strip, said hook strip disposed on an interior surface of one of said pair of sheets adjacent said fourth edge and said pile strip disposed on an interior surface of the other one of said pair of sheets adjacent said fourth edge whereby said hook and pile strips are engageable.

21. The map board assembly of claim 19 wherein said backing members comprise a non-porous, transparent material.

22. The map board assembly of claim 19 further comprising hook and pile strips, said hook strip being positioned on an exterior surface of a first one of said sleeves, said pile strip being positioned on an exterior surface of a second one of said sleeves whereby said hook and pile strips are engageable when said map board assembly is in a folded position.

23. The map board assembly of claim 19 further comprising threading securing said sleeves together.

24. The map board assembly of claim 19 further comprising an elastic loop secured to said map board assembly whereby an accessory may be inserted in said loop.

25. The map board assembly of claim 19 further comprising a light source detachably secured to map board assembly whereby said light source may illuminate one of the maps.

26. The map board assembly of claim 19 further comprising a nonporous, transparent overlay detachably securable to an exterior surface of each of said sleeves whereby erasable marks on said overlay may overlie the maps.

* * * * *